(12) United States Patent
Schulte (10) Patent No.: US 12,305,790 B2
(45) Date of Patent: May 20, 2025

(54) INSPECTION OR CLEANING PIG

(71) Applicant: ROSEN SWISS AG, Stans (CH)

(72) Inventor: Michael Schulte, Meppen (DE)

(73) Assignee: Rosen IP AG, Stans (CH)

(*) Notice: Subject to any disclaimer, the term of this patent is extended or adjusted under 35 U.S.C. 154(b) by 307 days.

(21) Appl. No.: 17/757,250

(22) PCT Filed: Dec. 11, 2020

(86) PCT No.: PCT/EP2020/085805
§ 371 (c)(1),
(2) Date: Jun. 13, 2022

(87) PCT Pub. No.: WO2021/116433
PCT Pub. Date: Jun. 17, 2021

(65) Prior Publication Data
US 2023/0003329 A1    Jan. 5, 2023

(30) Foreign Application Priority Data
Dec. 11, 2019  (DE) .......................... 102019134054.3

(51) Int. Cl.
| | | |
|---|---|---|
| *F16L 55/28* | (2006.01) | |
| *B08B 9/055* | (2006.01) | |
| *H01F 7/02* | (2006.01) | |
| *H01F 13/00* | (2006.01) | |
| *F16L 101/12* | (2006.01) | |
| *F16L 101/30* | (2006.01) | |

(52) U.S. Cl.
CPC ............ *F16L 55/28* (2013.01); *B08B 9/0553* (2013.01); *H01F 7/02* (2013.01); *H01F 13/00* (2013.01); *B08B 2209/055* (2013.01); *F16L 2101/12* (2013.01); *F16L 2101/30* (2013.01)

(58) Field of Classification Search
CPC .... B08B 9/0553; F16L 55/28; F16L 2101/12; F16L 2101/30; H01F 7/02; H01F 13/00
See application file for complete search history.

(56) References Cited

U.S. PATENT DOCUMENTS

| | | | | |
|---|---|---|---|---|
| 6,100,684 | A * | 8/2000 | Ramaut .................. | G01N 27/82 324/228 |
| 6,523,650 | B1 * | 2/2003 | Pribonic .................. | B60L 7/28 188/165 |
| 6,847,207 | B1 * | 1/2005 | Veach .................. | G01N 27/902 324/220 |
| 2016/0167094 | A1 * | 6/2016 | Danilov .................... | B60L 7/28 15/104.061 |

FOREIGN PATENT DOCUMENTS

| | | |
|---|---|---|
| CA | 2294605 A1 | 1/1999 |
| DE | 102013011626 A1 | 1/2015 |
| EP | 2685253 A2 | 1/2014 |
| WO | 2019146608 A1 | 8/2019 |

* cited by examiner

Primary Examiner — Marc Carlson
(74) Attorney, Agent, or Firm — Husch Blackwell LLP (57) ABSTRACT

A pig is provided for passing through a pipeline having a pipeline wall. The pig comprises at least one functional unit for cleaning the pipeline and/or for receiving pipeline information. The pig also comprises at least one magnet unit which is provided for magnetizing the pipeline wall, and which has a plurality of magnets. The magnet unit has a plurality of segments each with at least one magnet. The magnetizing devices of mutually adjacent segments are angled at least by approximately 90° to one another.

11 Claims, 11 Drawing Sheets

INSPECTION OR CLEANING PIG

CROSS REFERENCE

This application claims priority to PCT Application No. PCT/EP2020/085805, filed Dec. 11, 2020, which itself claims priority to German Application No. 10 2019 134054.3, filed Dec. 11, 2019, the entireties of both of which are hereby incorporated by reference.

FIELD OF THE INVENTION

The present invention relates to a pig, in particular an inspection or cleaning pig, for passing through a pipeline having a pipeline wall, wherein the pig has a functional unit for cleaning the pipeline and/or recording pipeline information and at least one magnet unit, which is provided for magnetizing the pipeline wall and has a plurality of magnets.

BACKGROUND OF THE INVENTION

DE 10 2013 011 626 A1 discloses a pig, which in particular passes through water, gas or oil pipelines, has a magnet unit which develops a braking action by generating eddy currents in the pipeline wall and the interaction of the latter with the magnetic field generating the same. In this way, the speed is kept in a range which is expedient for an inspection or measurement or else cleaning. The disadvantage is that the braking unit according to the invention becomes large and heavy, in particular in relatively long pigs, in order to apply the necessary forces. The result of this is that, because of the length of the magnet units relative to the longitudinal central axis of the pig, the latter becomes relatively large and thus the pipe bend mobility of the pig suffers.

BRIEF SUMMARY OF THE INVENTION

It is an object of the present invention to improve the pipe bend mobility of a pig.

In an embodiment, the magnet unit has a plurality of segments each with at least one magnet, and the magnetization directions of mutually adjacent segments are angled or tilted at least by approximately 90°, preferably by exactly 90°, to one another. By forming such a magnet unit, the magnetic flux densities can be increased and the result is a series of possible arrangements in which the flux densities in the pipeline wall are increased. The magnetic field acting on the pipeline wall and the magnetic fields generated there are more intense than in conventionally used magnets, so that the entire magnet unit can be shorter.

Preferably, a segment comprises a single magnet, in particular a permanent magnet, but it can also have a plurality of magnets, in particular oriented in the same direction with regard to their magnetization direction.

Mutually adjacent magnets are magnets which are separated by a magnet holder or are located touching one another directly. Magnets separated by a magnet holder are located on opposite sides of the magnet holder and rest on the latter, the in particular non-metallic magnet holder having a considerably smaller extent than the magnets themselves. Mutually adjacent magnets are in particular not spaced further than 3 mm from one another and preferably lie directly on one another. On the other hand, an enclosure of the segments of the magnet unit can have similar thicknesses to that of the focusing element.

In particular, as viewed in a direction transverse to the longitudinal direction of the pig which, in operation, lies parallel to a longitudinal extent of a pipeline, the magnets are located beside one another and thus one after another as viewed in the longitudinal direction.

Preferably, the magnets of the segments or the magnet unit are permanent magnets, in particular neodymium magnets. In particular, the poles of two segments which are directed toward each other and which are separated by a further segment have an identical polarity, which means that they both form either North or South poles which are directed toward each other, a magnet of a further segment being arranged between the magnets or segments. In particular, this segment arranged in between likewise points with its own North pole or South pole side in the direction of the pipeline wall during operation. As a result, initial focusing of the magnetic field lines toward the pipeline wall is already carried out during operation, while, on the side of the magnet unit which faces away from the pipeline wall, which is then as a rule correspondingly directed toward the longitudinal central axis of the pig, there is attenuation of the magnetic field lines. Such a type of magnet units, constructed in the manner of Halbach arrays, already lead to higher flux densities and higher magnetic field strengths in the pipeline wall, as a result of which the magnet units and therefore corresponding pig segments can be shorter.

In the following, the segments the magnets of which are provided with a magnetization direction (direction North-South) substantially perpendicular to the pipeline wall (in operation) are also designated vertical segments. The magnetization direction, which is identified by an imaginary line from the North to the South pole, lies in an angular range of ±15° around a perpendicular to the surface of the pipeline wall. Accordingly, the magnetization direction is inclined by 75° to 105°, preferably by 90°, to the longitudinal central axis of the pig when the pig runs in a desired normal position centered within the pipeline. The magnetization direction of a segment corresponds to the magnetization direction of the magnet or magnets forming the segment. For the purposes of the application, angled relative to one another at least by approximately 90° means angled relative to one another by between 85° and 95°.

The vertical segment leads to the introduction of magnetic field lines directed approximately or directly perpendicularly in the direction of the pipeline wall in operation, which is advantageous, for example, for an EMAT wall thickness measurement.

Generally, at least one assembly of a pig also having a plurality of segments is designated as a functional unit, which has a function for the pig and in particular the functionality necessary for the intended use of the pig (cleaning and/or recording pipeline information). Here, it can also be a functional unit for speed control. Likewise, in pigs for repairing a pipeline, it can also be a functional unit for recording pipeline information. The magnet unit can thus also be part of a functional unit.

A pig according to the invention is further improved if, according to a further refinement according to the invention, the vertical segment, viewed from a longitudinal central axis, is bounded radially on the outside by a focusing element. Such a focusing element, in particular formed at least substantially from steel, is used for the further focusing and intensification of the magnetic field lines. The focusing element is in particular magnetizable.

It has surprisingly been shown that, better than in magnet arrangements of a Halbach array type without focusing element(s), in which the maximum introduction of the magnetic field is limited by the saturation flux density, very high flux densities can be implemented by the additional use of the focusing element. The efficiency, i.e., the measurable magnetic field strength in a pipeline during operation, is increased by up to a factor of 3. Units to be used for the attainment of previous flux densities in the material of the pipeline wall can by implication thus be considerably smaller than hitherto, which in turn in particular improves the pipe bend mobility in the pipeline.

Accordingly, in a refinement of a pig according to the invention, in which the focusing element is bounded by a magnet on at least three sides, wherein the poles of the magnets located on these sides have an identical polarity but in particular at the same time belong to different segments, the result is a drastic increase in the magnetic field strengths and flux densities in the pipeline wall. Such a device according to the invention is considerably shorter than devices from the prior art generating the same forces.

The flux densities present in the focusing element, which in particular is at least substantially formed of steel comprising cobalt and iron, lie in particular at around 2.5 T, but at least around up to 2.3 T. For example, in a magnet unit provided with nine magnets located one after another, in which successive magnets have magnetization directions tilted relative to one another and which are arranged to form a type of Halbach array, an attraction force relative to the pipeline of up to 45 kN results. A magnet unit additionally provided as previously described with focusing elements but otherwise constructed with the same sequence and magnetization direction of the equally powerful magnets leads to attraction forces of 180 kN. Typical pipelines in the oil and gas sector of, for example, 3 cm wall thickness can be fully radially outwardly saturated as a result.

Pigs provided with corresponding magnet units can thus be considerably shorter with the same forces and exhibit improved pipe bend mobility. As a result of the smaller and therefore also lighter design of the pig according to the invention, the loading of the pipeline during the passage of the pig is reduced. For the purpose of further focusing of the magnetic field lines in the direction to or from the pipeline wall, according to a further exemplary embodiment according to the invention, the magnet units can have in the longitudinal direction an enclosure at least also formed of a magnetizable material, which bounds the magnets of the magnet unit. In a view in the direction transverse to the longitudinal direction of the pig, for example in the direction of travel, there are corresponding enclosures in the magnet unit at the front and back.

Alternatively or additionally, a preferably elongated magnet unit of a pig according to the invention can also be aligned transversely to the longitudinal central axis, wherein its outer side is then preferably matched to the curvature of the pipeline wall. In addition, magnet units formed with their longitudinal extent parallel to the longitudinal central axis of the pig can be provided with an outer side of which the curvature is matched with regard to the curvature of the pipeline wall.

The enclosure and the focusing element are in particular formed of cobalt-iron steel, but at least and in particular of magnetizable steel.

According to a development according to the invention, the magnet unit is provided with a sensor for recording pipeline information, i.e. inspection data. This sensor is in particular arranged in the focusing element, in a recess in the same and/or on the focusing element and is thus arranged centrally in the magnet unit. According to the above, the result is that the magnetization directions of the segments not formed as vertical segments preferably extend parallel or approximately parallel to the longitudinal central axis of the pig. Additionally or alternatively to such a formation as an inspection pig, for example with an EMAT and/or wall thickness sensor, the magnet unit can at least co-form an eddy current braking unit, wherein there are preferably a plurality of magnet units adjoining one another in the circumferential direction around the longitudinal central axis of the pig, i.e. located beside one another and possibly offset in the direction of the longitudinal central axis of the pig. In addition, an eddy current braking unit has constructional features comprising attachments to a supporting structure, spring elements for damping and/or possible connections for further pig segments.

An eddy current braking unit is designed to generate a speed-dependent braking force by means of interaction of the magnets with the wall of the pipeline because of magnetic fields induced by an eddy current. The radial component of the magnetic flux density that is relevant to the braking force is maximized because of the design according to the invention.

The magnet unit preferably has at least three magnets arranged one after another in its longitudinal direction, wherein, according to a further exemplary embodiment, in particular seven magnets are arranged one after another, so that there are preferably two focusing elements bounded by North poles of permanent magnets and one focusing element bounded by South poles. Furthermore, it is in particular possible to arrange for respective focusing elements to be bounded laterally not only by three but in particular also by five magnets.

While magnet units for forming eddy current braking units and/or for inspection are typically square, blocky and/or elongated, according to a further exemplary embodiment according to the invention it may be advantageous to form ring-shaped magnet units, in order to generate appropriate magnetic fields specifically in the pipeline wall.

In order to avoid adhesion effects on the pipeline wall, a pig according to the invention according to a further exemplary embodiment has at least one spacer, which is preferably designed to be adjustable with regard to a distance of the magnets from the wall, and via which the magnet unit can be positioned at a distance from the pipeline wall.

Preferably, the length of the magnet unit, including any enclosures, is less than 0.5 times the diameter DPipe of the pipeline, preferably less than 0.3 times $D_{Pipe}$, where $D_{Pipe}$=diameter of the pipeline in meters. The length of the magnet unit here is based on the longitudinal central axis of the pig.

In a refinement of the magnet unit according to the invention as an eddy current braking unit, at a speed of 2 m/s in the pipeline, this is designed to generate a braking force F as a function of the pipeline diameter of at least 7000 N/m multiplied by $D_{Pipe}$, where $D_{Pipe}$=the diameter of the pipeline in meters.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

Individual technical features of the exemplary embodiments described below can also be combined in combination with previously described exemplary embodiments and the features of the independent claim and, if appropriate, further claims to form articles according to the invention. If expedient, functionally identical elements are provided with identical designations.

Figure 1:
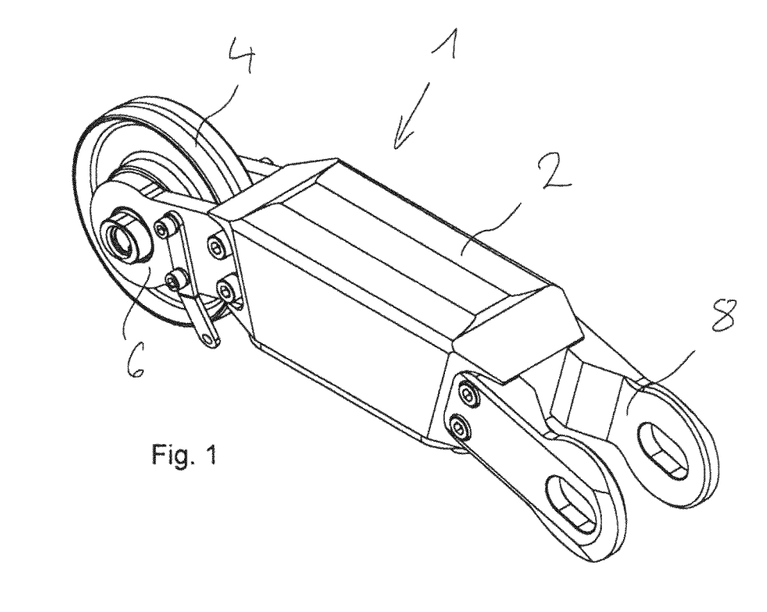
FIG. 1 shows a spacer with a magnet unit of a pig according to the invention in a perspective illustration.
Figure 3:
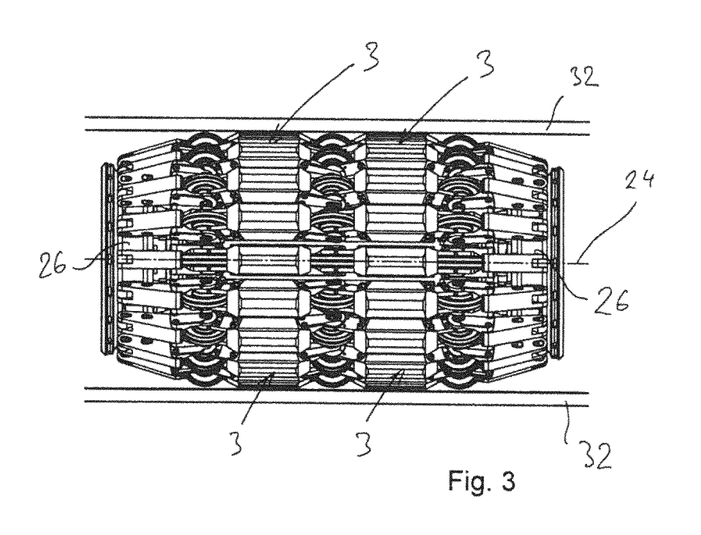
FIG. 3 shows part of a pig according to the invention comprising a plurality of magnet units in a side view.

A spacer 1 having a magnet unit of a pig according to the invention is illustrated perspectively in FIG. 1. The spacer 1 comprises a housing 2, in which a magnet unit 3 that can be seen in FIG. 3 is housed. The housing 2 is depicted with its side directed towards the pipeline wall illustrated from above in FIG. 1. Via a wheel 4, which is rotatably mounted in a fork 6, a distance to the pipeline wall is set. Illustrated on the opposite end of the spacer 1 is a further fork 8, which is mounted on a supporting frame of the pig and/or can possibly be provided with a further wheel.

Figure 2:
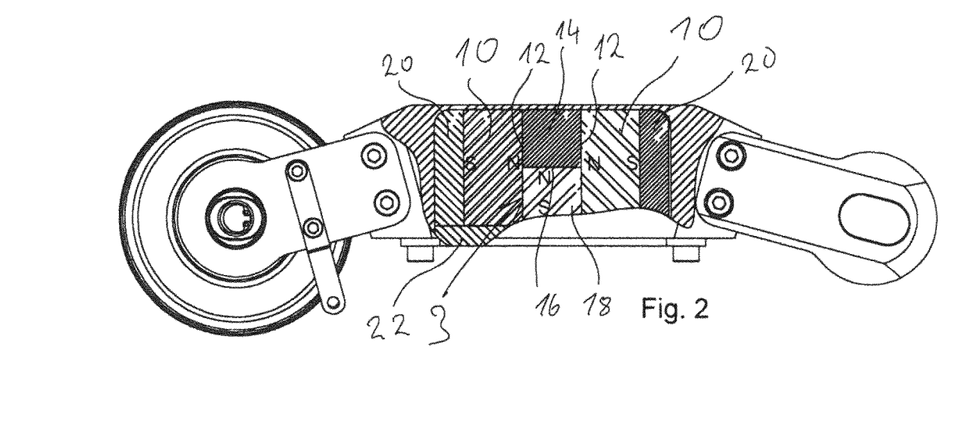
FIG. 2 shows the article according to FIG. 1 in a partly sectioned view.

The magnet unit 3 has two magnets 10, of which the magnetization directions (direction North-South) extend parallel or at least approximately parallel to the longitudinal central axis of the pig and of which the North-pole sides 12 face toward each other (FIG. 2). At the same time, both North-pole sides 12 rest on a focusing element 14. On its radial side relative to the longitudinal central axis 24 of the pig, to be characterized in more detail below, a further magnet rests with its North-pole side 16 (cf. FIG. 3). This magnet 18 has a magnetization direction which is tilted or angled by 90° relative to the magnetization direction of the magnets 10.

In the longitudinal direction of the pig, the magnet unit has enclosures 20, which are made of a magnetizable material, preferably a steel comprising cobalt and iron, wherein the enclosures 20 bound the magnets of the magnet unit in such a way that they adjoin the latter at the front and back in the longitudinal direction.

The focusing element 14 is also made of a steel comprising cobalt and iron. As a result of the arrangement radially outward from a longitudinal central axis 24, the focusing element achieves flux densities of preferably 2 to 3 Tesla. The magnetic flux is compressed by the magnets 18 through the focusing element 14 formed as a steel element such that focusing of the magnetic field lines toward the pipeline results. While standard Halbach arrays are limited in their maximum introduction of the magnetic field by the saturation flux density, as a result of the design of the pig according to the invention, the attraction force is enlarged by a factor of at least 3 as previously described. Therefore, weight and costs can be kept correspondingly low. The segments of the magnet units in the exemplary embodiments of the figures are each formed by a magnet, which then also predefines the magnetization direction of the respective segment.

On the inner side of the magnet unit 3, directed toward the longitudinal central axis 24 of the pig, there is an internal enclosure 22, which additionally shields the magnetic field from the magnet unit, which is in any case already virtually negligible, toward the inside.

A pig segment of a pig according to the invention is illustrated in FIG. 3, a multiplicity of magnet units 3 being arranged beside one another in the circumferential direction about a longitudinal axis 24. Furthermore, two rings of magnet units 3 are arranged one after another relative to the longitudinal central axis 24 of the pig. Magnet units 3 located one behind another in the longitudinal direction parallel to the longitudinal central axis 24 are attached to one another in an articulated manner, so that the result is very good pipe bend mobility of the eddy current braking unit illustrated in FIG. 3. The spacers 1 themselves are in turn mounted movably on a supporting frame 26.

Figure 4:
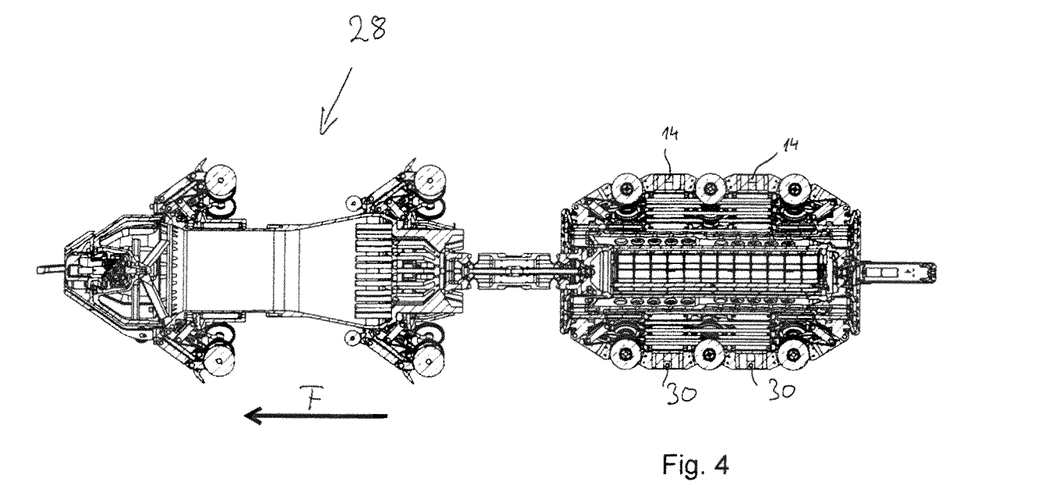
FIG. 4 shows a pig according to the invention in a partly sectioned view.

According to FIG. 4, a pig according to the invention has a pulling segment 28, illustrated on the left in FIG. 4, which ensures forward drive in the direction F. In addition, sensors 30, illustrated only partly and schematically, are introduced into the focusing elements 14. The sensors 30 are in particular EMAT-WT sensors, i.e. sensors for the electromagnetic-acoustic measurement of the wall thicknesses of the pipeline wall 32. The pig segment on the right in the figure is thus designed firstly as an eddy current braking unit and secondly as a functional unit for recording inspection data or pipeline information. The magnet unit can also be part of the functional unit.

Figure 5:
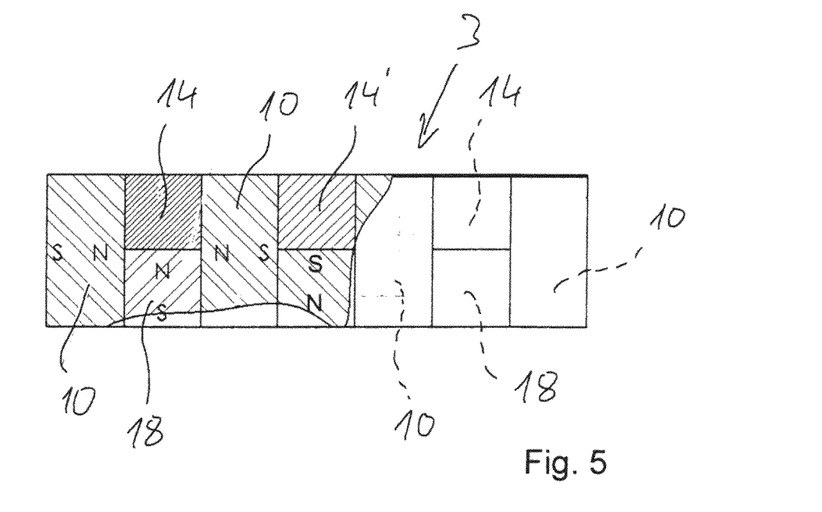
FIG. 5 shows a simplified view of a magnet unit in a partly sectioned illustration.
Figure 6:
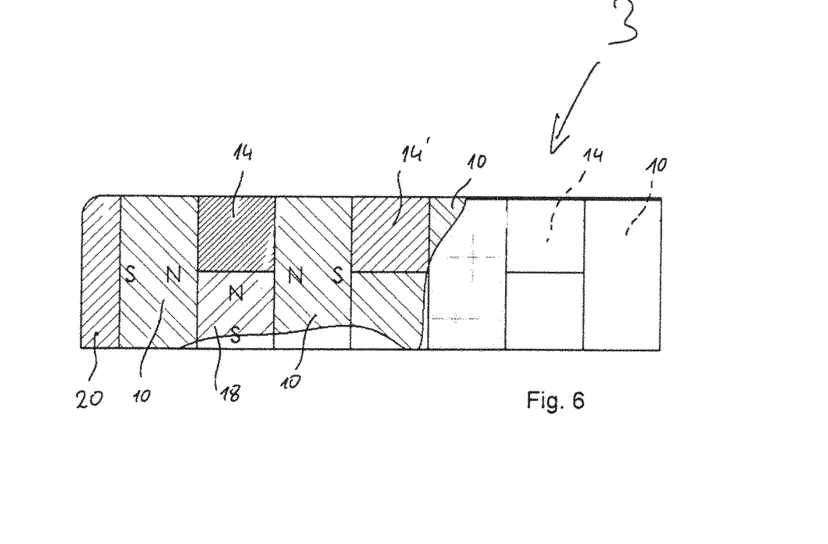
FIG. 6 shows a magnet unit of a further article according to the invention.

A magnet unit of a further pig according to the invention having a higher number than three magnets is illustrated in FIG. 5. Focusing elements 14 are respectively arranged on the North-pole sides of the adjacent magnets 10 and 18 in the present case. A further focusing element 14' is correspondingly bounded by South-pole sides of the adjacent magnets. In addition to this, a magnet unit can have the enclosure 20 illustrated in FIG. 6, as already described.

Figure 7:
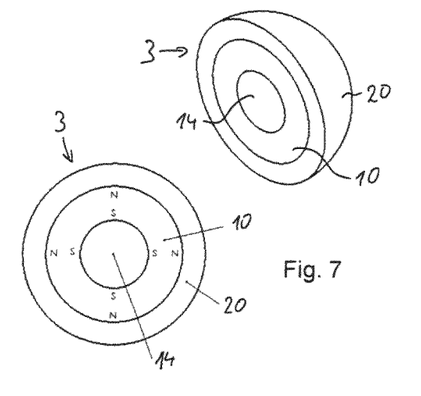
FIG. 7 shows a view of an article according to the invention in an operating position in a sectional illustration.

FIG. 7 discloses, in the two depictions there, an alternative design of a magnet unit 3. The depiction on the top right in FIG. 7 shows a perspective illustration, while a matching cross section is illustrated on the bottom left in FIG. 7. A hemispherical focusing element 14 is bounded by a one-piece or multi-part magnet 10 which is ring-shaped in cross section and which is in turn arranged within an enclosure 20.

Figure 8:
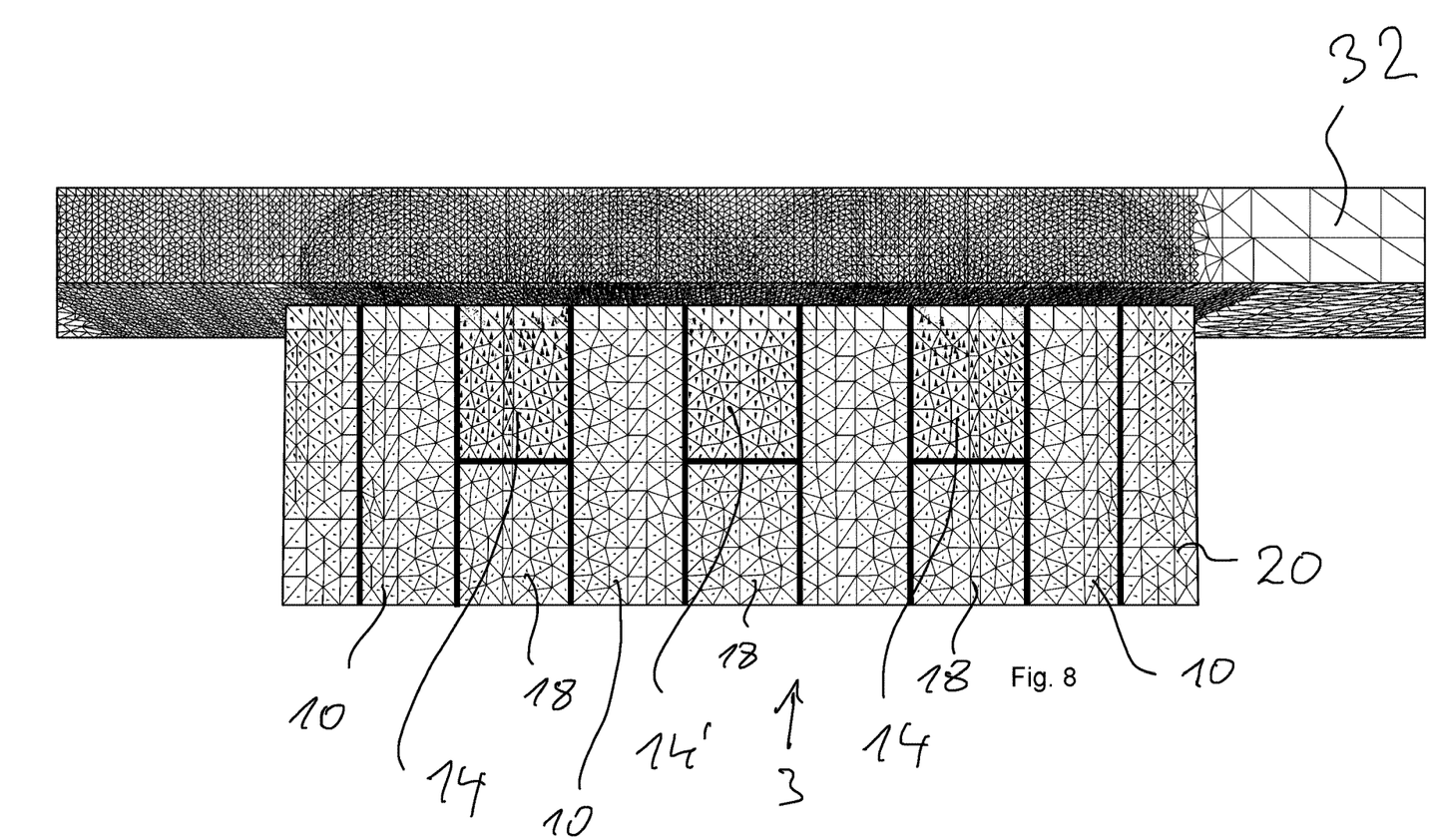
FIG. 8 shows magnetic field lines in a magnet unit of an article according to the invention and an adjacent pipeline wall.

The magnetic field lines arising in a magnet unit 3 and in a pipeline wall 32 arranged closely beside the latter during operation are symbolized in FIG. 8 by black, acute-angled triangles. In FIG. 8, these are located in the cells of a triangular grid, produced on the basis of the simulation, both of the magnet unit 3 and of the pipeline wall 32. The more intense the gradients of the magnetic field lines in relation to direction and/or amplitude, the finer the resolution and the smaller the cells of the grid. The magnetic flux densities present in the focusing elements 14, 14' are particularly high, symbolized by correspondingly large triangles.

Figure 9:
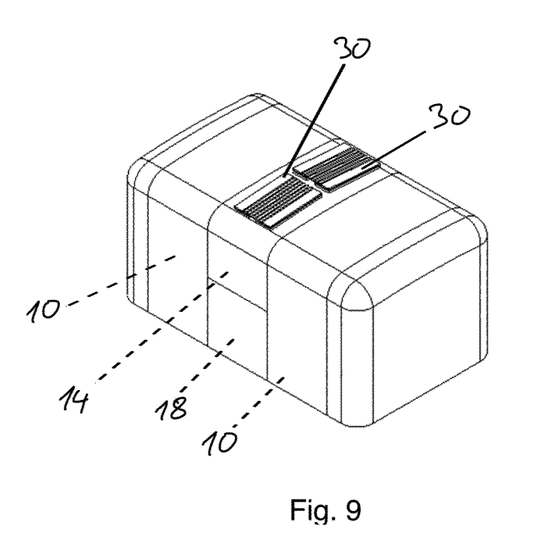
FIGS. 9-11 show further variants of a magnet unit.

According to a further exemplary embodiment of the invention, the magnet unit is designed as part of a functional unit for recording inspection data or pipeline information (FIG. 9). Here, the magnet unit is arranged to be housed in a similar way to that in FIG. 2, wherein in addition, on that side of the focusing element 14 which is directed toward the pipeline wall or the metal surface to be inspected, said focusing element being illustrated only dashed because of the housing, two sensors 30 are fitted, which can in particular be EMAT-WT sensors. Further parts of the magnet unit are magnets 10 and 18, likewise illustrated only dashed because of the housing. This functional unit uses the magnetic field generated by the focusing of the Halbach array and intensified as a result to excite acoustic waves with the aid of electromagnetic force transmission, for example, as a result of which the non-destructive testing of sheet metals of any type in relation to the remaining wall thickness becomes possible.

Figure 10:
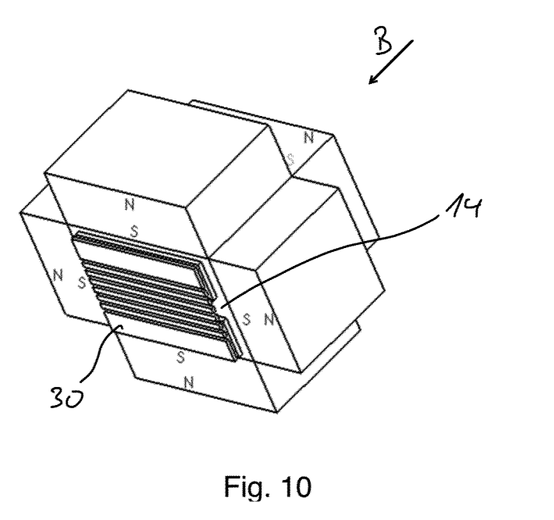

In a further variant of a pig according to the invention, having a once more similarly constructed magnet unit, additional magnets are attached to the sides of the magnet unit, which continue to focus and thus further intensify the magnetic field onto the focusing element 14 in an identical way (FIG. 10). Here, too, once more a sensor 30 is arranged, which permits the recording of inspection data. As a result of the variant of the focusing element, now enclosed on four sides and in particular rectangular in a top view, a magnetic field that is virtually directed maximally in the direction of the surface to be inspected, and therefore an optimal magnetic bias, is generated. Here, the viewing direction B is indicated by means of an arrow B. The direction B is also the direction of the magnetic field in the direction of the surface. For example, two, three or four of the magnet units according to FIG. 10 distributed uniformly in the circumferential direction around a pig longitudinal axis can be used for the wall thickness measurement by means of the associated functional unit.

Figure 11:
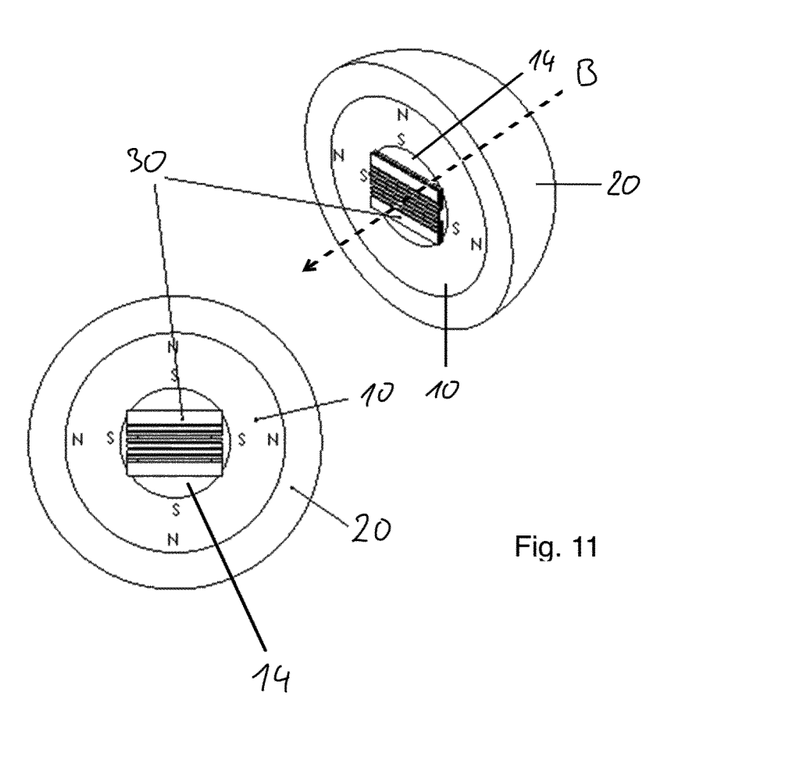

A maximally optimized variant is also disclosed in FIG. 11, in which the magnet 10 is arranged in the form of a spherical shell around the central focusing element. A bottom view is shown in the bottom left part of FIG. 11, while a perspective illustration is illustrated in the top right part in FIG. 11. Around the hemispherical shell of the magnet 10 there is a further hemispherical shell made of steel as a magnetic circuit closure of the focused magnetic field. Here, too, once more sensors 30 are arranged in order to obtain information about the inspected surface.

In general, the magnet units of a pig according to the invention can be used to form eddy current braking units in which, because of a multiplicity of magnet units arranged in the circumferential direction around a longitudinal axis of the pig, a ring-shaped current running around in the circumferential direction can be formed in the pipeline wall.

The invention claimed is:

1. A pig for passing through a pipeline having a pipeline wall, the pig comprising:
   at least one functional unit for cleaning the pipeline and/or recording pipeline information;
   at least one magnet unit for magnetizing the pipeline wall, the at least one magnet unit having a plurality of magnets, wherein the magnet unit further includes a plurality of segments each with at least one magnet, wherein the magnetization directions of mutually adjacent segments are angled at least by approximately 90° to one another;
   wherein the magnet unit has magnets formed as permanent magnets, wherein the poles (N, S) of first and third segments which are directed toward each other, and which are separated by a further second segment, have an identical polarity;
   wherein second segment is a vertical segment with a magnetization direction directed in the direction of the pipeline wall in operation;
   wherein the second segment, viewed from a longitudinal central axis, is bounded radially on an outside by a focusing element.

2. The pig as claimed in claim 1, wherein the focusing element is bounded by a magnet on at least three sides, wherein the poles of the magnets located on said sides have an identical polarity.

3. The pig as claimed in claim 1, wherein the magnet unit has in the longitudinal direction at least one enclosure at least also formed of a magnetizable material, which bounds the magnets of the magnet unit.

4. The pig as claimed in claim 1, wherein the magnet unit has a sensor for recording inspection data.

5. The pig as claimed in claim 1, wherein the sensor is arranged in the focusing element, in a recess in the same and/or on the focusing element.

6. The pig as claimed in claim 1, wherein the magnet unit co-forms an eddy current braking unit.

7. The pig as claimed in claim 1, wherein the magnet unit has at least three magnets arranged one after another in its longitudinal direction.

8. The pig as claimed in claim 1, wherein a plurality of magnet units are arranged beside one another in the circumferential direction of the pig.

9. The pig as claimed in claim 1, further including at least one spacer, via which the magnet unit is positioned at a distance from the pipeline wall.

10. The pig as claimed in claim 1, wherein a length of the magnet unit, including any enclosures, is less than $0.5*D_{Pipe}$, where $D_{Pipe}$=diameter of the pipeline [m].

11. The pig as claimed in claim 1, wherein at a speed of 2 m/s in the pipeline, the magnet unit generates a braking force F as a function of the pipeline diameter of at least $F=m*D_{Pipe}$, where $D_{Pipe}$=the diameter of the pipeline [m] and m=7000 N/m.

* * * * *